United States Patent
Takiguchi et al.

(10) Patent No.: US 6,956,689 B2
(45) Date of Patent: *Oct. 18, 2005

(54) OPTICAL DEVICE (75) Inventors: Yoshihiro Takiguchi, Hamamatsu (JP); Kensaku Itoh, Fuchu-machi (JP); Junpei Yamanaka, Nagoya (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/381,318

(22) PCT Filed: Sep. 26, 2001

(86) PCT No.: PCT/JP01/08384
§ 371 (c)(1),
(2), (4) Date: Jun. 25, 2003

(87) PCT Pub. No.: WO02/27384
PCT Pub. Date: Apr. 4, 2002

(65) Prior Publication Data
US 2004/0012840 A1 Jan. 22, 2004

(30) Foreign Application Priority Data
Sep. 26, 2000 (JP) ........................ 2000-292703

(51) Int. Cl.[7] ............................ G02B 26/00
(52) U.S. Cl. ................ 359/290; 359/321; 359/291
(58) Field of Search ............... 359/240, 245, 359/252–53, 280, 285, 288, 296, 290–91, 321–24; 372/64, 39, 41; 385/129, 141–2, 123, 125, 8, 27, 39–40; 264/437–40, 108, 313

(56) References Cited

U.S. PATENT DOCUMENTS

| 6,542,682 | B2 | * | 4/2003 | Cotteverte et al. | 385/125 |
| 6,631,234 | B1 | * | 10/2003 | Russell et al. | 385/125 |
| 6,685,870 | B2 | * | 2/2004 | Ukechi et al. | 264/437 |
| 2004/0008934 | A1 | * | 1/2004 | Takiguchi et al. | 385/27 |
| 2004/0057472 | A1 | * | 3/2004 | Takiguchi et al. | 372/20 |
| 2004/0213534 | A9 | * | 10/2004 | Matsuura et al. | 385/129 |

FOREIGN PATENT DOCUMENTS

WO 98/59219 12/1998

* cited by examiner

Primary Examiner—Georgia Epps
Assistant Examiner—Jessica Stultz
(74) Attorney, Agent, or Firm—Morgan Lewis & Bockius LLP (57) ABSTRACT

A photonic crystal 2 with plasticity is arranged by making microspheres of silica or barium titanate or air bubbles be contained in a gel substance. When an external force is applied to this photonic crystal, photonic crystal 2 deforms and the photonic band gap is readily changed thereby. When the photonic band gap changes, the passage of light of a specific wavelength is restricted. Light of a desired wavelength is thus output from photonic crystal 2. With this invention, this wavelength can be varied readily by means of an external force.

11 Claims, 11 Drawing Sheets

*Fig.2*

TRANSPARENT GEL SUBSTANCE: 2G

OPTICAL DEVICE

TECHNICAL FIELD

This invention relates to an optical device using a photonic crystal.

BACKGROUND ART

A semiconductor monocrystal is a substance with which specific atoms are aligned in a periodic and regular manner. Its electron propagation characteristics are determined by the atomic interval inside the semiconductor crystal. That is, a semiconductor has an energy band gap, and this energy band gap is determined by the wave properties of electrons and the periodic potential of the atoms.

Meanwhile, a photonic crystal is a three-dimensional structure wherein substances that exhibit a potential difference with respect to light, in other words, substances with a refractive index difference are aligned in a period close to the wavelength of light. Such substances that make up a photonic crystal have been proposed by Yablonovic and others.

Within a photonic crystal, the optical propagation characteristics are limited by the constraints of the wave properties of light. That is, the propagation of light inside a photonic crystal are subject to restrictions in a manner similar to the propagation of electrons in a semiconductor. In a photonic crystal, a forbidden zone for light or so-called photonic band gap exists, and due to the existence of this band gap, light of a specific wavelength band cannot propagate inside the crystal.

Various photonic crystals have been proposed since priorly. For example, there are photonic crystals wherein submicron particles are aligned in a period close to the wavelength of light. For microwave bands, there are photonic crystals in which polymer spheres are aligned within space as the particles.

Besides these, there are photonic crystals with which polymer spheres are hardened inside a metal and thereafter the polymer spheres are dissolved chemically to form periodic microscopic spaces inside the metal, photonic crystals with which holes are bored at equal intervals within a metal, photonic crystals, with which regions that differ from their surroundings in refractive index are formed in a solid material using a laser, photonic crystals, with which a photopolymerizing polymer is processed to a groove-like form using a lithography technique, etc. A photonic crystal that has been formed by such processing has a photonic band gap that is uniquely determined by the structure.

An optical device using such a photonic crystal can selectively output a predetermined wavelength range of input light. In the description that follows, light that is input into a photonic crystal shall be referred to as "input light" and light that is output from a photonic crystal upon passage through the photonic crystal shall be referred to as "output light."

DISCLOSURE OF THE INVENTION

However, with an optical device, since the photonic band gap of a photonic crystal cannot be varied adequately, the wavelength of the output light cannot be varied. This invention has been made in view of this problem, and an object thereof is to provide an optical device, with which the wavelength of the output light can be varied adequately by means of deformation by external force.

In order to resolve the above problem, this invention provides in an optical device, with which an external force is applied to a photonic crystal to change the photonic band gap of the photonic crystal, an optical device with which the photonic crystal has plasticity.

Since the photonic crystal of this invention has plasticity, when an external force is applied and the photonic crystal is deformed, the photonic band gap changes greatly and the wavelength of the output light from the photonic crystal changes adequately. With such an optical device, since effective wavelength selection can be performed even if the volume of the photonic crystal itself is made small, the entire device can be made compact.

This invention's optical device is characterized in furthermore comprising an external force application means for applying the abovementioned external force. As the external force application means, various types are possible.

One type of arrangement is characterized in that the external force application means is a piezoelectric element that deforms in accordance with an electrical input. In this case, since an external force is applied to the photonic crystal by means of deformation of the piezoelectric element by an electrical input, a system that performs an electrical input based on a specific measured value, etc., can be arranged.

Another type of arrangement is characterized in that the external force application means is a pressing mechanism that presses the photonic crystal in accordance with a manual input. In this case, since fine adjustment of a manually applied external force is enabled in an experimental measurement system, the device can be applied to basic research on photonic crystals, etc.

Yet another type of arrangement is characterized in that the external force application means is a hollow member, which can be deformed in manner such that its inner diameter changes, and the photonic crystal is disposed inside the hollow member. Since the hollow member deforms in a manner such that its inner diameter changes, the photonic crystal deforms in accordance with this deformation in a manner such that it expands or contracts in the length direction of the hollow member. The input light is input from one end in the length direction of the photonic crystal and is output from the other end. The spreading of light in the radial direction can thus be restrained and the lowering of intensity per unit area of the output light can be restrained.

Also, an optical device by this invention is characterized in furthermore equipping a feedback means, which measures a physical quantity that varies in accordance with the photonic band gap of the photonic crystal and controls the magnitude of the external force applied by the external force application means in accordance with the measured value. In order to obtain a desired photonic band gap, a physical quantity, which varies in accordance with the photonic band gap and is preferably the output light intensity or output light spectrum, is measured and the feedback means is made to control the external force application means so that the intensity of output light or the intensity of a specific wavelength will be constant.

Also, an optical device by this invention is characterized in furthermore equipping a heater, which heats the photonic crystal, and a temperature sensor, which measures the temperature of the photonic crystal and in that the power supplied to the heater is controlled in accordance with the temperature measured by the temperature sensor. In this case, since heating is performed while measuring the temperature of the photonic crystal with the temperature sensor, the temperature of the photonic crystal can be set to a desired value, which is preferably a fixed value, in order to restrict variation of the photonic band gap due to temperature.

Also, an optical device by this invention is characterized in furthermore equipping a container, which houses the photonic crystal, and in that the external force application means applies pressure in a fixed direction as the abovementioned external force to the photonic crystal that is housed inside the container. In this case, the photonic crystal may be held by an outer wall of the container to restrict deformation due to forces besides the desired external force and limit the direction of deformation.

Also, an optical device by this invention is characterized in that at least a part of the outer walls of the container is transparent or a transparent window is disposed at this part and light is input into the photonic crystal via this part. In this case, the input light is input into the photonic crystal via the transparent outer wall or window, and since the photonic crystal is held by the corresponding outer wall, the number of parts can be reduced.

The abovementioned photonic crystal is characterized in that a plurality of microspheres of silica or barium titanate are contained in a gel substance. The abovementioned photonic crystal may also be arranged to contain a plurality of microscopic spaces formed inside a gel substance. In such cases, the photonic crystal can be deformed readily.

Also, an optical device by this invention is characterized in that the abovementioned container is formed by processing a semiconductor substrate and the piezoelectric element is formed on the semiconductor substrate. In this case, since the photonic crystal is disposed in the container, in particular, in an indented part formed on the semiconductor substrate and the piezoelectric element is formed on this semiconductor substrate, these components can be formed using semiconductor microelectromechanic techniques and the entire device can be made compact.

BEST MODES FOR CARRYING OUT THE INVENTION

Optical devices of embodiments shall now be described. Elements that are the same or have the same functions shall be provided with the same symbols and redundant descriptions shall be omitted.

Figure 1:
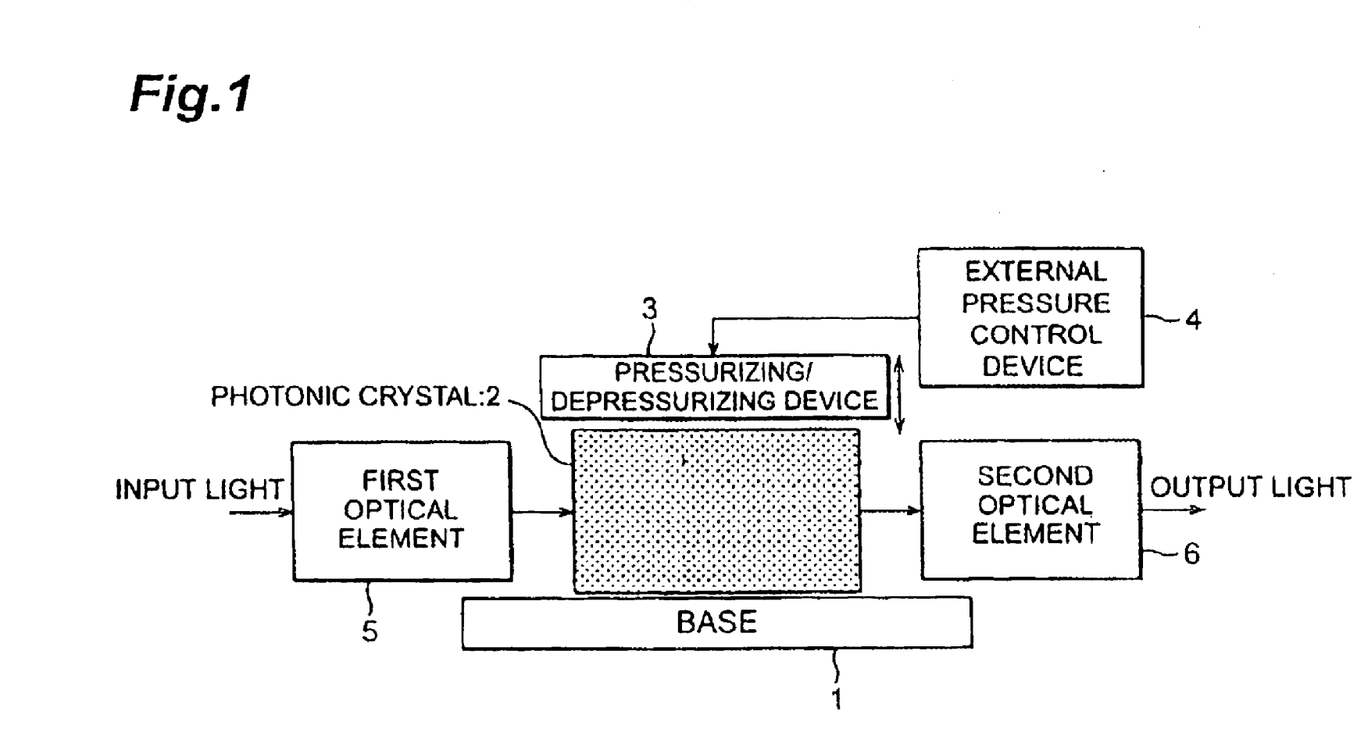
FIG. 1 is an explanatory diagram of an optical device of an embodiment.

FIG. 1 is an explanatory diagram of an optical device of an embodiment. This optical device is a device that selects a desired wavelength band from the wavelength band of input light and outputs light of this desired wavelength band as output light. A photonic crystal 2 is placed on a base 1, and photonic crystal 2 is urged by a pressurizing/depressurizing device (external force application means) 3, which applies pressure or reduces the pressure applied to photonic crystal 2.

Photonic crystal 2 deforms in a precise manner in accordance with the application of an external force and is a substance with which the photonic band gap changes in accordance with the deformation. When photonic crystal 2 is deformed by pressurizing/depressurizing device 3, its photonic band gap changes. Pressurizing/depressurizing device 3 is controlled by an external pressure control device (external force control means) 4, and external pressure control device 4 controls the magnitude and duration of application of the abovementioned external force.

The input light is input into photonic crystal 2 upon passage through a first optical element 5 that allows propagation of light. Components of specific wavelengths in the input light cannot pass through photonic crystal 2 and a predetermined wavelength band is selected in accordance with the photonic band gap (optical response characteristic) and output as the output light from photonic crystal 2. The output light is input into a second optical element 6 that allows propagation of light and is output to the exterior of the present optical device via second optical element 6. That is, the optical coupling characteristic between first and second optical elements 5 and 6 is changed by the application of external force.

The present optical device is an optical device, with which the photonic band gap of photonic crystal 2 is changed by the application of external force to photonic crystal 2, and photonic crystal 2 has plasticity. Photonic crystal 2 may also have elasticity.

Since photonic crystal 2 has plasticity, when photonic crystal 2 is deformed by the application of external force, the photonic band gap changes greatly and the wavelength of the output light from photonic crystal 2 thus changes adequately. With such an optical device, since effective wavelength selection will be enabled even when the volume of photonic crystal 2 itself is made small, it is possible to make the entire device compact.

Figure 2:
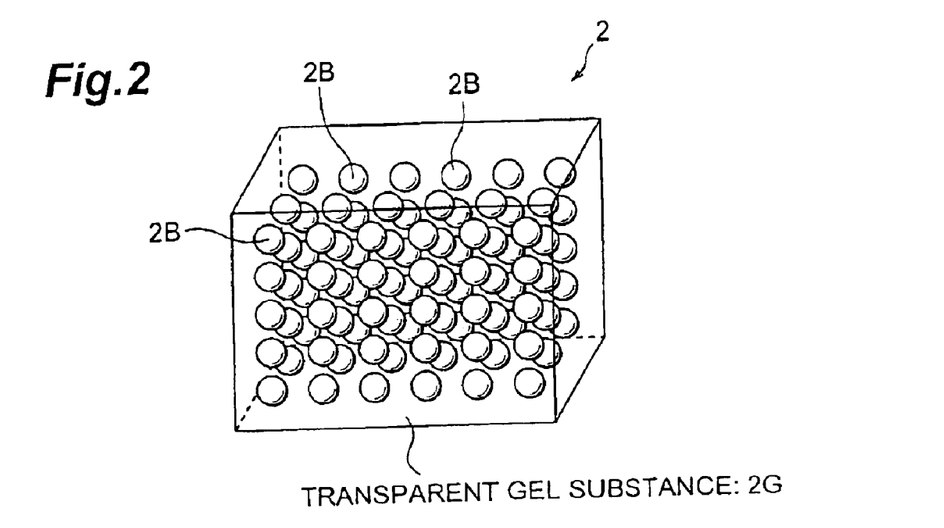
FIG. 2 is a perspective view of a photonic crystal 2.

FIG. 2 is a perspective view of photonic crystal 2.

With this photonic crystal 2, a plurality of microspheres (optical microcrystals) 2B of silica or barium titanate are contained inside a gel substance 2G. This photonic crystal 2 can be deformed readily. Microspheres 2B are aligned uniformly in a regular manner at a period close to the wavelength of light inside substance 2G. The interval between microspheres 2B is half to one-fourth the wavelength of the light that is to be selected, and microspheres 2B are transparent to this wavelength. When light of a wavelength band $\Delta\lambda$ (which includes $\lambda_1$) is made to enter photonic crystal 2, only components of a specific wavelength band $\lambda_1$ are transmitted through photonic crystal 2 in accordance with the photonic band gap.

Since a gel is readily deformed by external force, the photonic band gap of photonic crystal 2 changes readily. Due to this change, the abovementioned wavelength band $\lambda_1$ that passes through photonic crystal 2 changes. Microspheres 2B and substance 2G differ in refractive index and both are transparent to the selected wavelength of light.

For example, a material having an ultraviolet-curing resin mixed therein may be used as a sol material and gelling may be accomplished by illuminating this material with ultraviolet rays. A mixture of a crosslinking agent and a photopolymerization initiator in acrylamide is a representative example of an ultraviolet-curing resin, and various other examples are known since priorly.

Since it is sufficient for the number of periodic structures of microspheres 2B to be approximately 50, photonic crystal 2 will function adequately even if it is an element with a maximum size of 100 $\mu$m square. Compactness of a device can thus be realized by using this photonic crystal 2.

Figure 3:
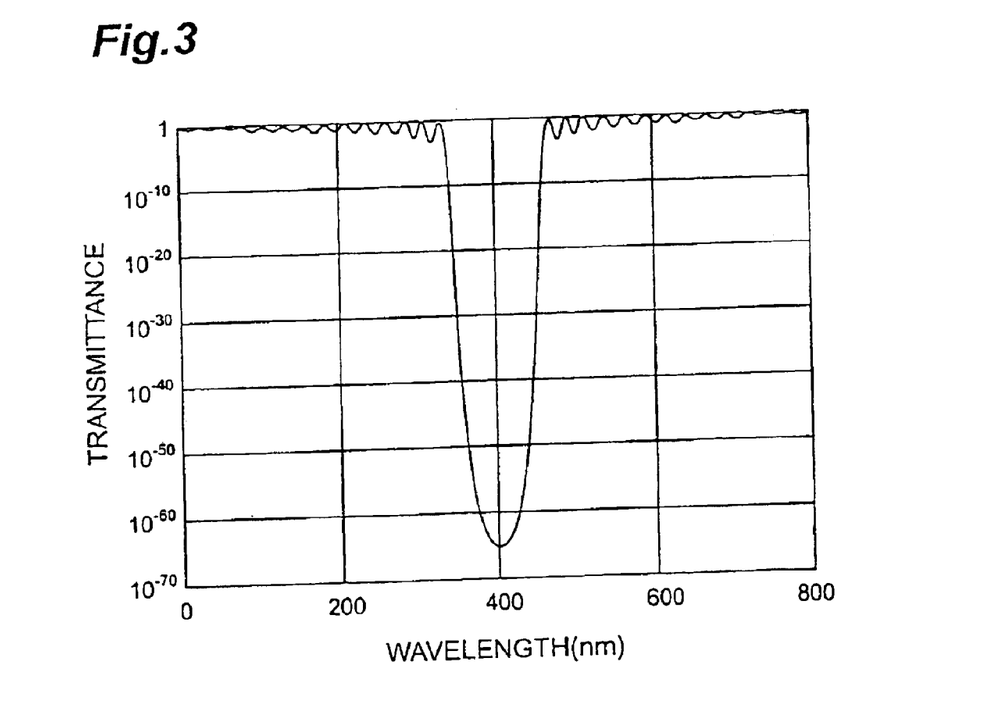
FIG. 3 is a graph, showing the wavelength (nm) dependence of the transmittance (arbitrary constant) of output light by a dichroic mirror.

FIG. 3 is a graph, showing the wavelength (nm) dependence of the transmittance (arbitrary constant) of output light by a photonic crystal with a multilayer film structure, that is, a dichroic mirror. The input light is white light. Though this graph is not that of the above-described photonic crystal 2, in a case where microspheres 2B are aligned at completely equal intervals, the optical characteristics for a specific direction will be the same as those illustrated in this Figure. With the present example, the transmittance of light near the wavelength of 400 nm is lowered in comparison to light of the surrounding wavelength bands.

The above-described optical device has external force application means 3 for applying the abovementioned external force, and various types of external force application means are possible.

Figure 4:
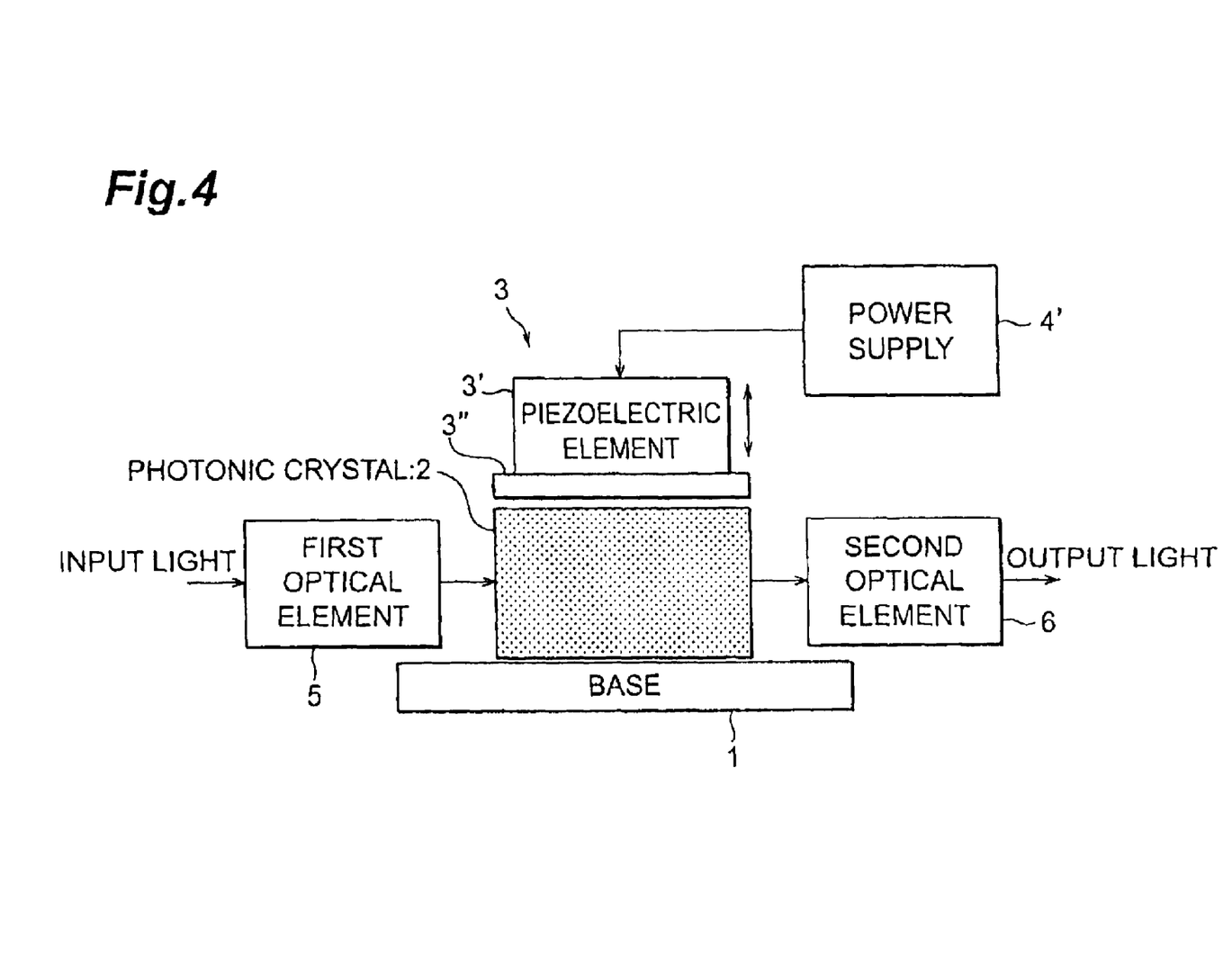
FIG. 4 is an explanatory diagram, showing a favorable example of an optical device.

FIG. 4 is an explanatory diagram, showing a favorable example of the above-described optical device. In this case, the above-described external force application means 3 is a piezoelectric element (piezo element) 3', which deforms in accordance with an electrical input. A voltage variable power supply 4' is used as external pressure control device 4.

With the present example, piezoelectric element 3' moves in the direction perpendicular to the surface of base 1 in accordance with the voltage applied from power supply 4'. A presser plate 3" is disposed above photonic crystal 2, and together with base 1, presser plate 3" sandwiches photonic crystal 2. The upper surface of piezoelectric element 3' is set at a position that is fixed with respect to base 1 and the lower surface is fixed to presser plate 3". Since when piezoelectric element 3' expands or contracts, the distance between presser plate 3" and base 1 changes, photonic crystal 2 deforms in an elongating manner along the optical path.

With such an arrangement, since piezoelectric element 3' is deformed by an electrical input and applies an external force to photonic crystal 2, a system that performs an electrical input based on a specific measured value, etc., can be arranged.

Figure 5A:
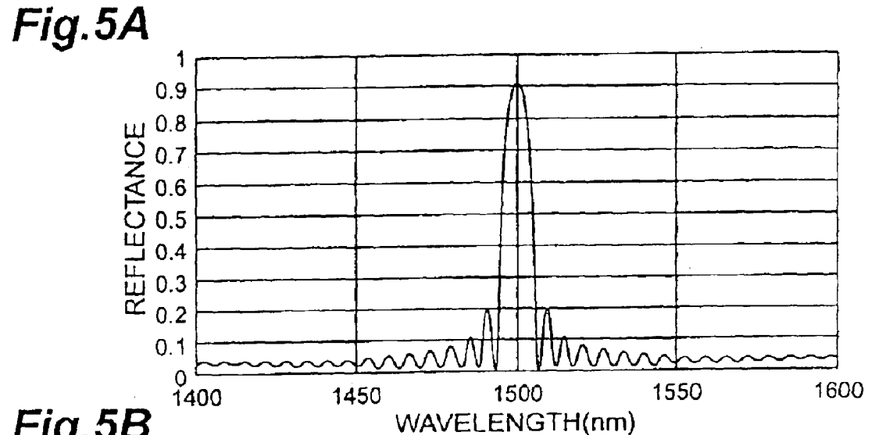
FIGS. 5A, 5B, and 5C are graphs, showing the wavelength (nm) dependence of the transmittance (arbitrary constant) of output light by a dichroic mirror.
Figure 5B:
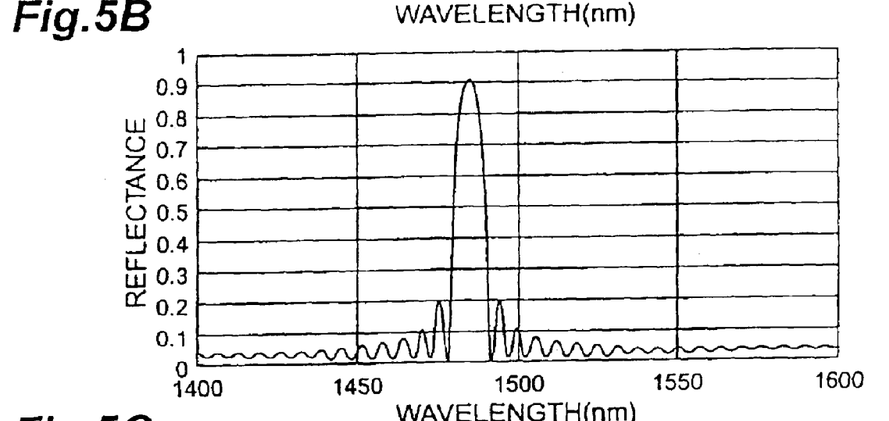
Figure 5C:
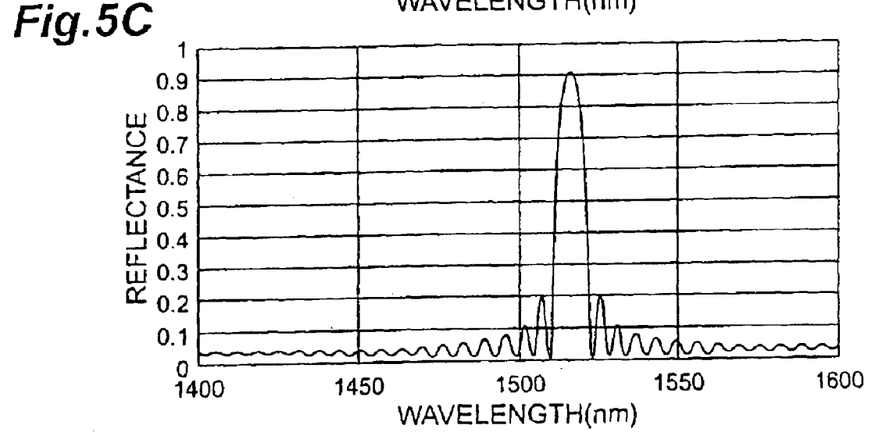

FIGS. 5A, 5B, and 5C are graphs, showing the wavelength (nm) dependence of the transmittance (arbitrary constant) of output light by a photonic crystal with a multilayer film structure, that is, a dichroic mirror. FIG. 5A is a graph for the case where an external force is not applied to the dichroic mirror, FIG. 5B is a graph for the case where a pressure is applied to give rise to a 1% lattice distortion in the direction perpendicular to the mirror, and FIG. 5C is a graph for the case where a pressure is applied to give rise to a 1% lattice distortion in the direction perpendicular to the mirror. A pressure may also be applied to give rise to a lattice distortion a long the mirror surface.

As shown by these graphs, the wavelength $\lambda_{CENTER}$ at which the peak intensity of the reflectance spectrum lies is approximately 1.5 $\mu$m in the case where there is no external force. The wavelength $\mu_{CENTER}$ shifts to approximately 1470 nm (to the shorter wavelength side) when a 1% compressive strain is applied and shifts to 1530 nm (to the longer wavelength side) when a 1% expansive strain is applied.

Though the characteristics shown in these graphs are not those of the photonic crystal 2 shown in FIG. 4, the trends of variation of the optical characteristics of photonic crystal 2 are the same as those shown in these graphs and the wavelength band of the output light varies with external force, in other words, strain.

The abovementioned photonic crystal 2 may be one with which a plurality of microscopic spaces are formed and contained in a gel substance.

Figure 6:
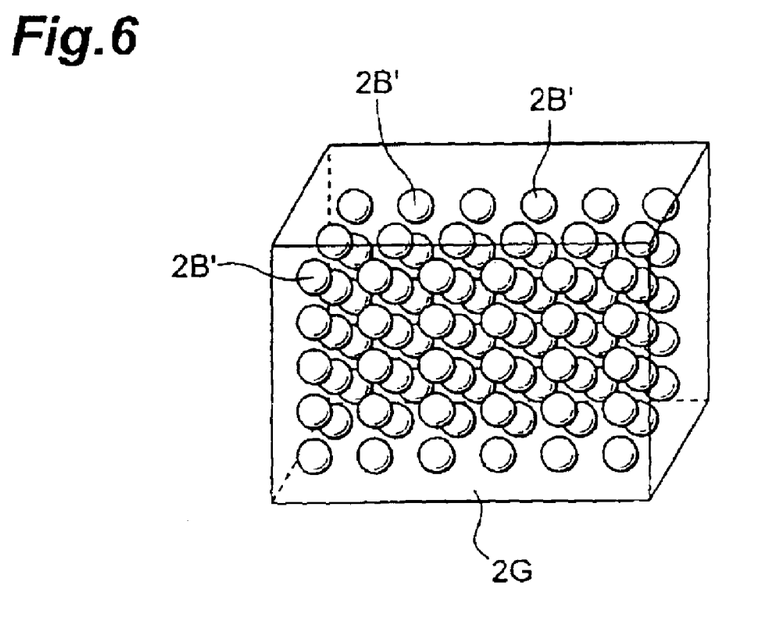
FIG. 6 is a perspective view of a photonic crystal 2 that uses air bubbles.

FIG. 6 is a perspective view of a photonic crystal 2 that uses air bubbles as the abovementioned microscopic spaces. This photonic crystal 2 has a plurality of air bubbles 2B' inside a substance 2G, and the air bubbles 2B' take the place of the abovementioned microspheres 2B. Such a photonic crystal 2 can also be deformed readily by an external force.

Figure 7:
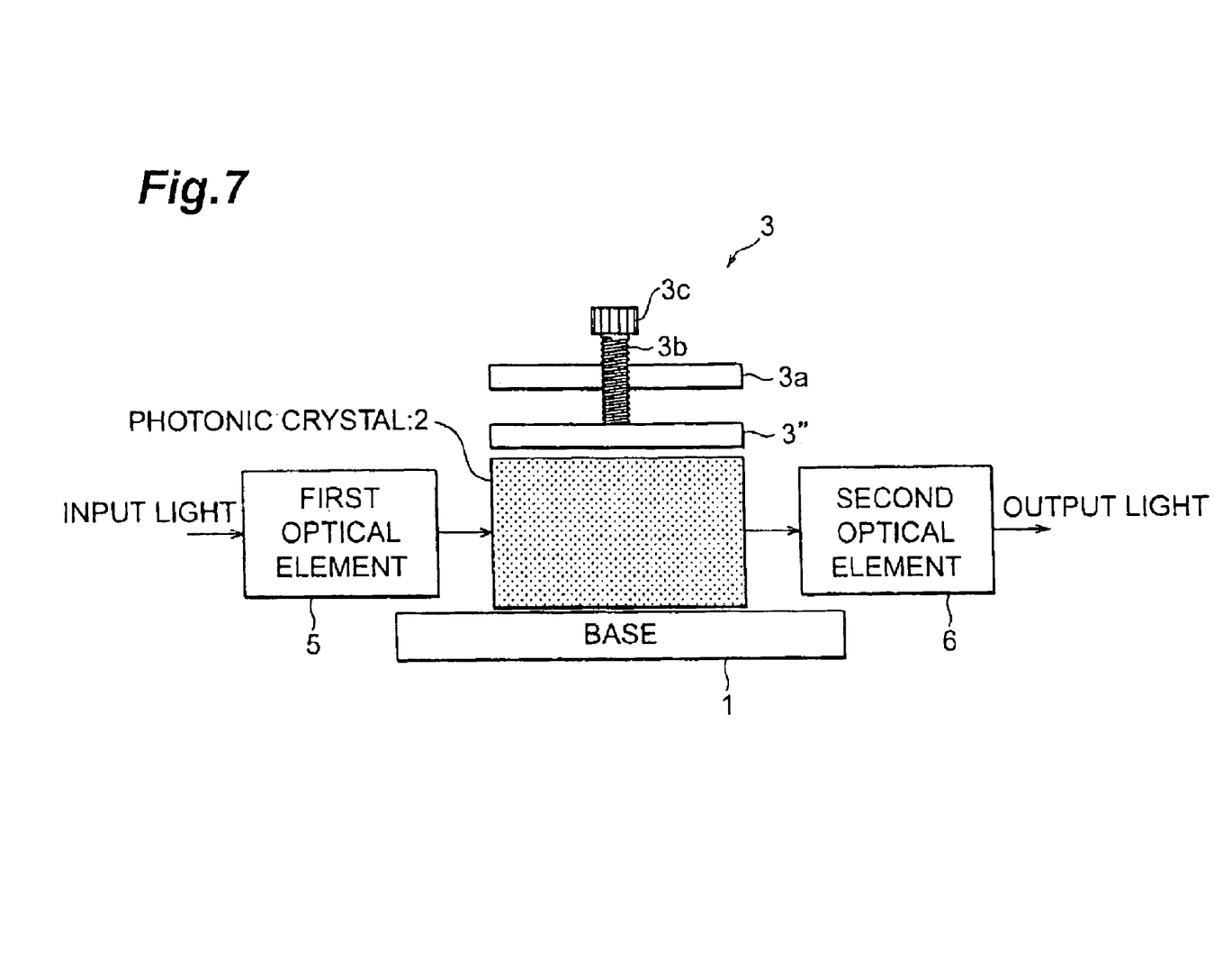
FIG. 7 is an explanatory diagram of an optical device of another embodiment.

FIG. 7 is an explanatory diagram of an optical device of another embodiment. With this example, a pressing mechanism 3, which presses photonic crystal 2 in accordance with a manual input, is arranged as the external force application means 3 of FIG. 1, and besides external pressure control device being operated manually, the arrangement is the same as that of FIG. 1. Pressing mechanism 3 is equipped with a supporting plate 3a, which is disposed at a position that is fixed with respect to base 1, a screw part 3b, which is engaged with a threaded hole provided in supporting plate 3a, and a screw feeding mechanism, comprising a screw turning head 3c that is fixed to one end of screw part 3b, and a presser plate 3" is put in contact with the other end of screw part 3b.

When head 3c is rotated in a predetermined direction, screw part 3b moves in the direction of presser plate 3". Since photonic crystal 2 is fixed by an adhesive agent to the lower surface of presser plate 3", as head 3c is rotated, an external force is applied to photonic crystal 2 and photonic crystal 2 deforms in an elongating manner along the optical path. Photonic crystal 2 has plasticity and can also be deformed in a compressive and expansive manner.

With such an optical system, fine adjustment of a manually applied external force is enabled in an experimental measurement system. The present device can thus be applied to basic research, etc., on photonic crystals.

Figure 8:
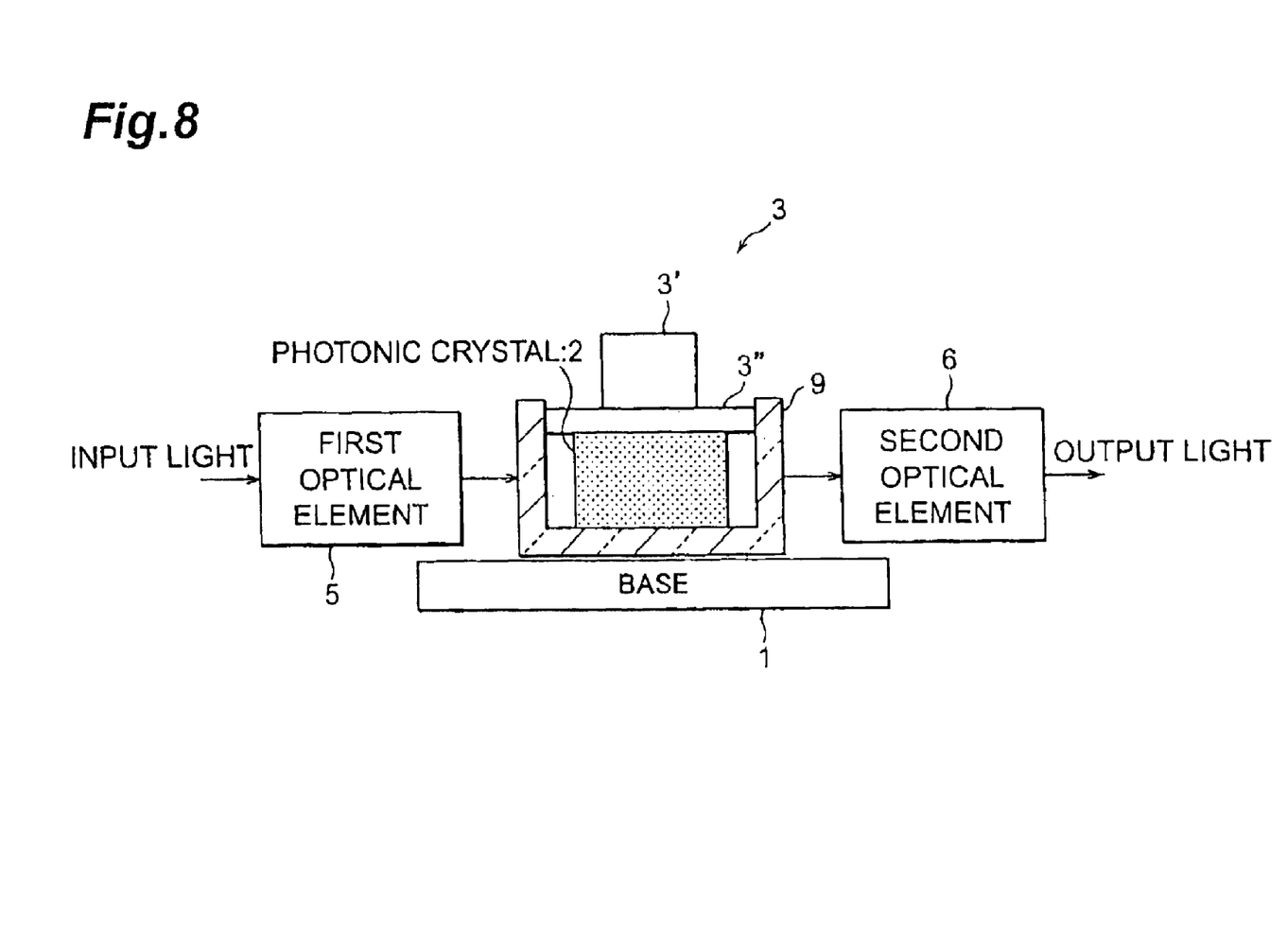
FIG. 8 is an explanatory diagram of an optical device of another embodiment.

FIG. 8 is an explanatory diagram of an optical device of another embodiment.

This optical device is furthermore equipped with a container 9 that houses a photonic crystal 2, and an external force application means 3 applies pressure as an external force in a fixed direction with respect to photonic crystal 2 housed inside container 9. In this case, photonic crystal 2 may be held by an outer wall of container 9 to restrict deformation due to forces besides the desired external force and limit the direction of deformation. With this example, a piezoelectric element 3' is used as external force application means 3.

At least a part of the outer walls of container 9, that is, the optical path for the input light is transparent. Or, a transparent window may be disposed at this part. The input light is input into photonic crystal 2 via the transparent wall or window. The outer wall in the optical path for the output light may also be transparent. Since photonic crystal 2 is held by the corresponding outer wall, the number of parts required of the device can be reduced. A tube-type piezoelectric element may also be used as external force application means 3 for photonic crystal 2.

Figure 9:
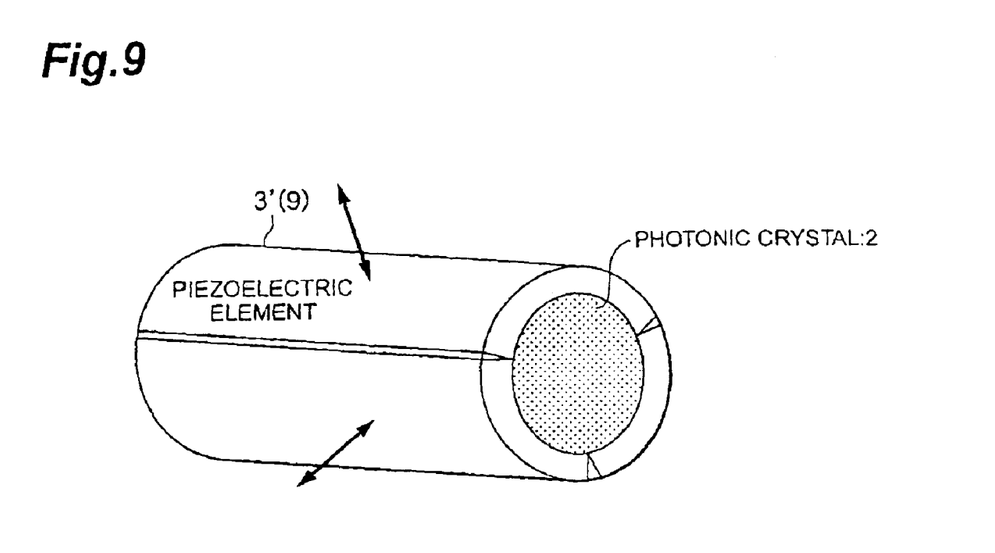
FIG. 9 is a perspective view, showing the principal parts of an optical device that uses a tube-type piezoelectric element.

FIG. 9 is a perspective view, showing the principal parts of an optical device that uses a tube-type piezoelectric element. Piezoelectric element (hollow member) 3', which serves as external force application means 3, is a tube-type element and this is used as a container inside which a photonic crystal 2 is disposed. That is, external force application means 3 of this example is a piezoelectric element 3', which is deformable in a manner such that its inner diameter changes, and the photonic crystal is disposed inside piezoelectric element 3'.

Piezoelectric element 3' deforms in a manner such that its inner diameter changes, and in accordance with this deformation, photonic crystal 2 deforms in a manner such that it expands or contracts in the length direction of the hollow piezoelectric element. The input light is input from one end in the length direction of photonic crystal 2 and the output light is output from the other end. Spreading of light in the radial direction can thus be restrained, and by use of this type of piezoelectric element, the lowering of intensity per unit area of the output light can be restrained.

Figure 10:
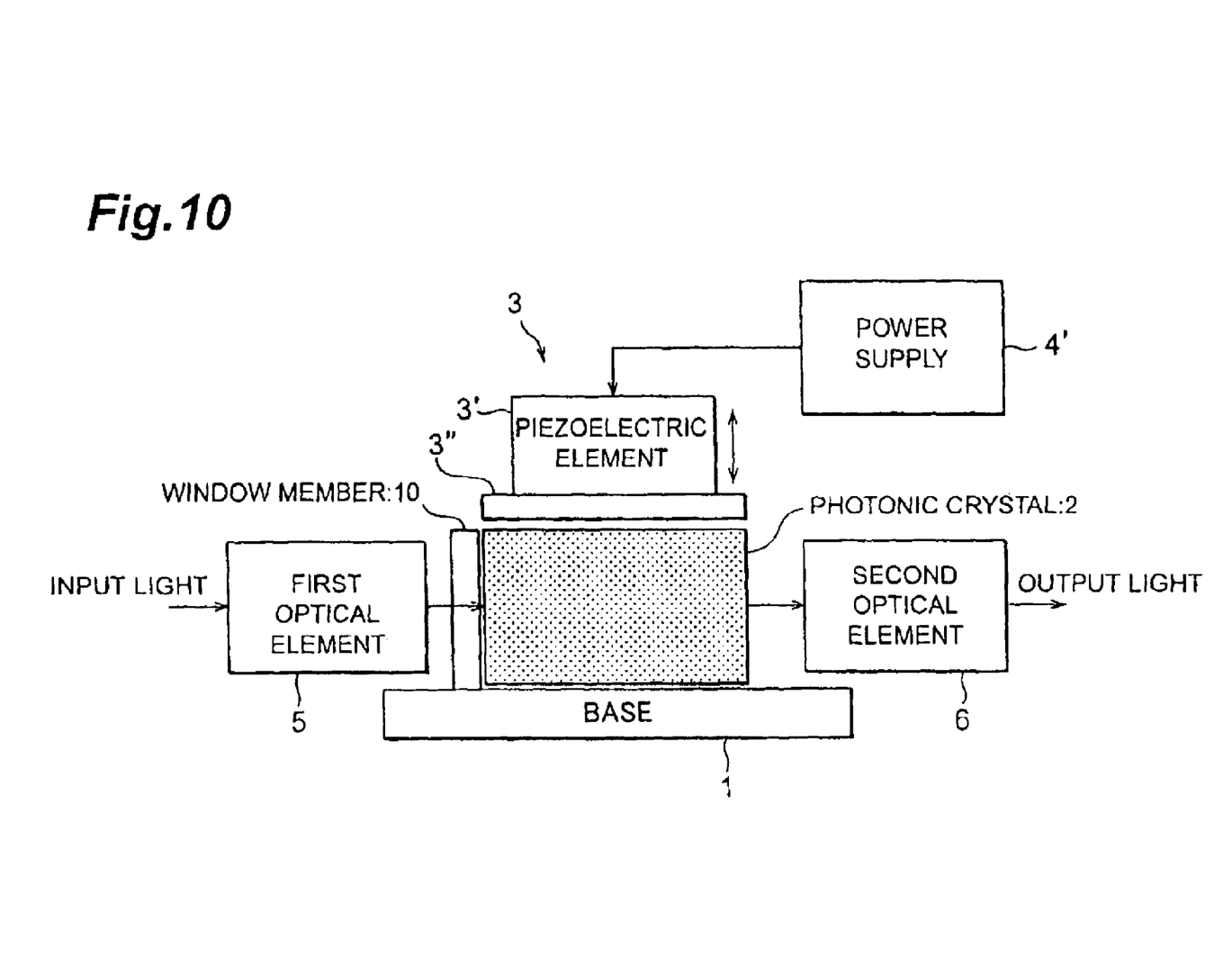
FIG. 10 is an explanatory diagram of an optical device of yet another embodiment.

FIG. 10 is an explanatory diagram of an optical device of yet another embodiment. This optical device differs from that shown in FIG. 4 in that a window member 10 is adhered onto the light input surface of a photonic crystal 2, and besides this, the arrangement is the same as that shown in FIG. 4. The input light that exits from first optical element 5 is introduced via window member 10 into photonic crystal 2. With this embodiment, the light input surface of photonic crystal 2 can be protected by means of window material 10. Window material 10 may also be an optical filter.

Figure 11:
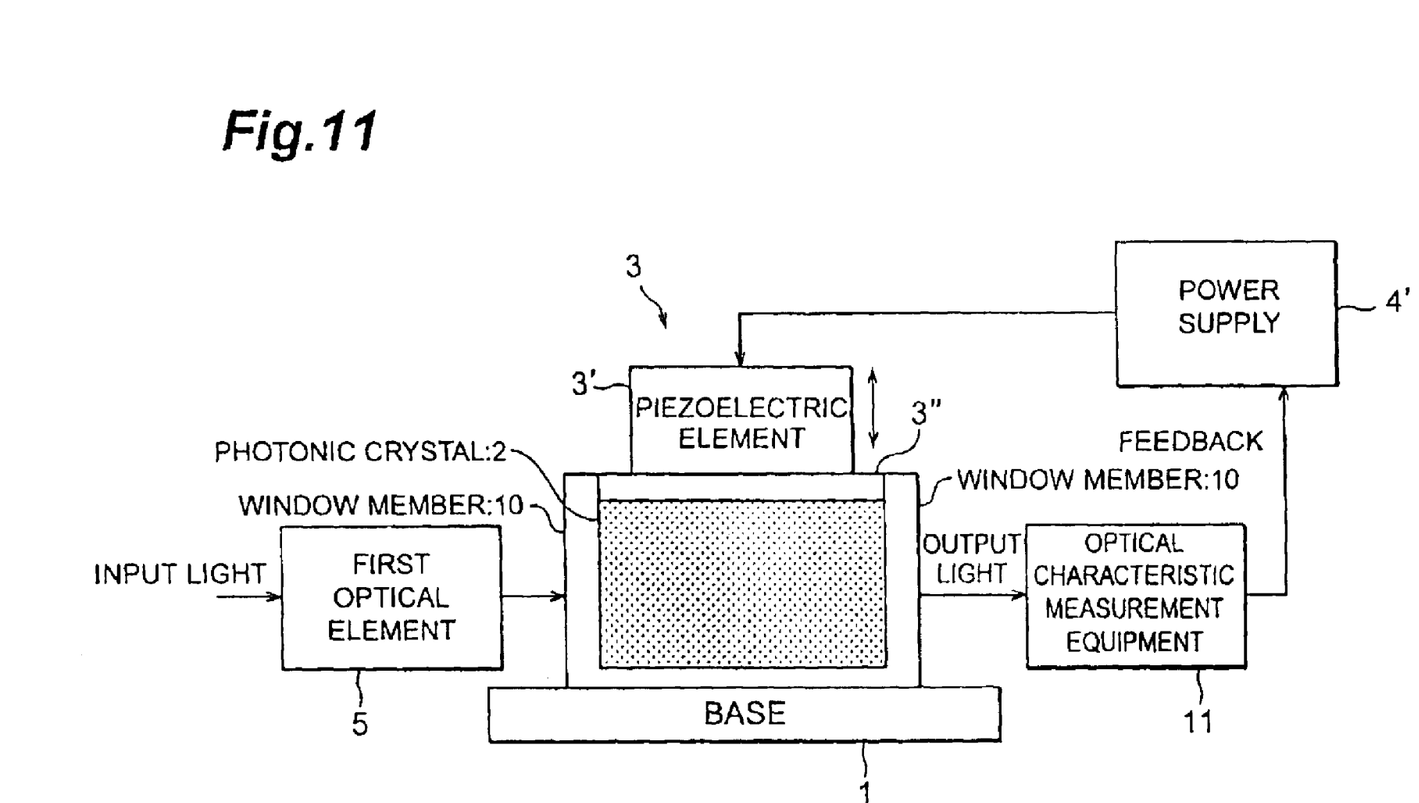
FIG. 11 is an explanatory diagram of an optical device of yet another embodiment.

FIG. 11 is an explanatory diagram of an optical device of yet another embodiment. This optical device differs from that shown in FIG. 10 in that a window member 10 is adhered onto the light output surface of a photonic crystal 2 as well and in that a feedback means (optical characteristic measurement equipment 11 and power supply 4'), which measures a physical quantity that varies in accordance with the photonic band gap of photonic crystal 2 and controls the magnitude of the external force applied by external force application means 3 in accordance with the measured value, is provided, and besides these, the arrangement is the same as that shown in FIG. 10.

In order to make the photonic band gap of photonic crystal 2 a desired photonic band gap, a physical quantity, which varies in accordance with the photonic band gap and is preferably the output light intensity or output light spectrum, is measured and feedback means 11 and 4' are made to control external force application means 3 so that the intensity of output light or the intensity of a specific wavelength will be constant.

To be more detailed, the light that has been modulated by photonic crystal 2 is subject as the output light to measurement of its intensity spectrum by optical characteristic measurement equipment 11 and piezoelectric element 3', which serves as a structure control device, is subject to feedback control so that the measured data will take on a specific value. For example, if the intensity of a specific wavelength that is measured is low, piezoelectric element 3' is made to expand or contract in a predetermined direction and when this causes the intensity to increase, piezoelectric element 3' is made to expand or contract in the same direction, while when the intensity decreases, piezoelectric element 3' is made to expand or contract in the opposite direction.

By this feedback control, the output light response characteristics of photonic crystal 2 can be stabilized and made high in precision.

Photonic crystal 2 may also be produced using semiconductor microelectromechanic (MEMS) techniques. For example, the abovementioned container is formed by processing a semiconductor substrate and piezoelectric element 3' is formed on this semiconductor substrate (not shown). In this case, since photonic crystal 2 is disposed in the container, in particular, in an indented part formed on the semiconductor substrate and piezoelectric element 3' is formed on this semiconductor substrate, semiconductor microelectromechanic techniques can be used to form these components and make the entire device compact. Needless to say, a driving circuit for piezoelectric element 3', a power supply, a photodiode with wavelength filter, etc., may also be formed within the semiconductor substrate.

Semiconductor microelectromechanic techniques are also used to prepare, for example, the probe of a scanning tunnel microscope. This probe is provided with a piezoelectric element and expansion and contraction of the piezoelectric element can be controlled in the order of a few nm's.

Figure 12:
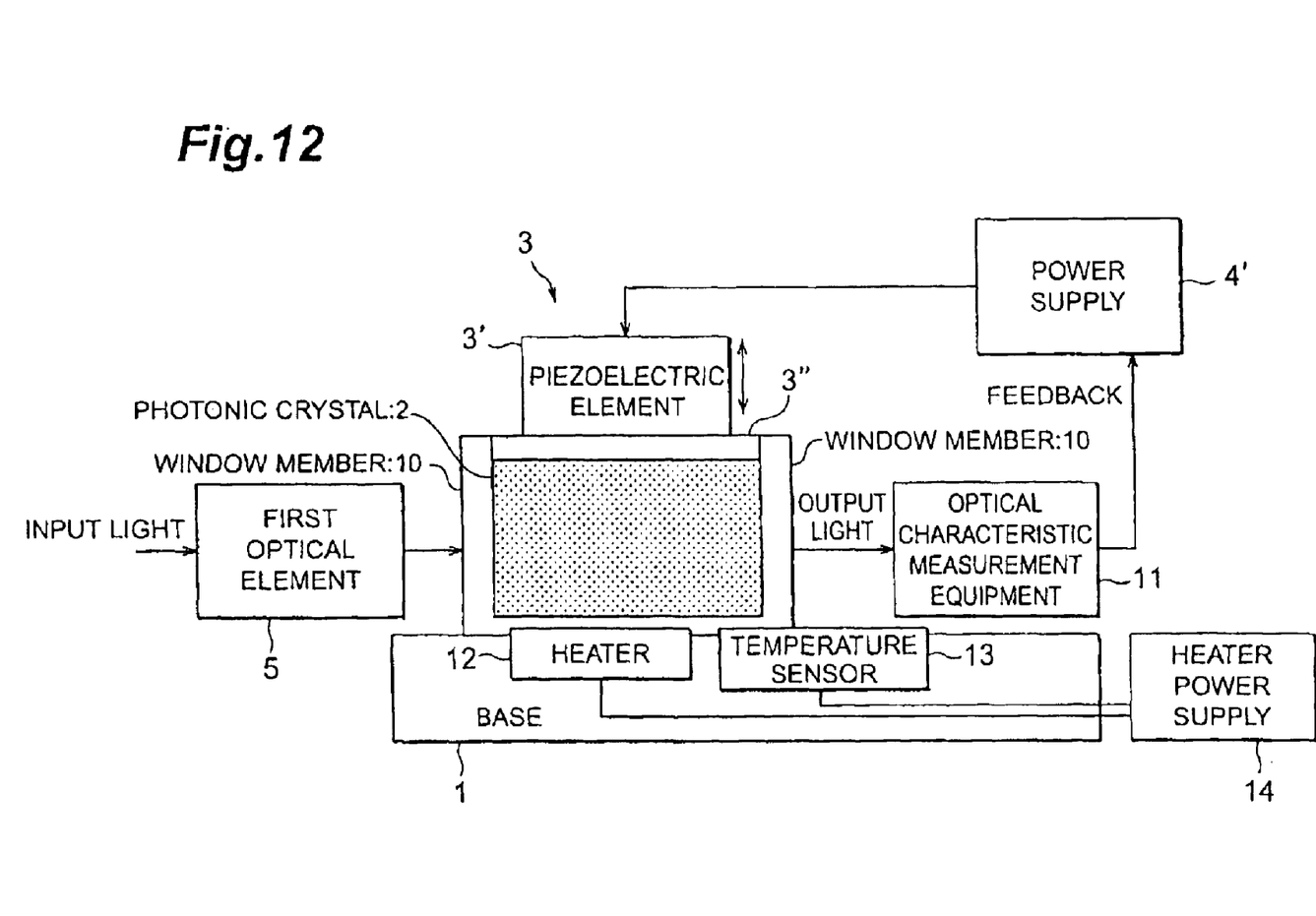
FIG. 12 is an explanatory diagram of an optical device of yet another embodiment.

FIG. 12 is an explanatory diagram of an optical device of yet another embodiment. This optical device differs from that shown in FIG. 11 in being equipped with a heater 12, a temperature sensor 13, and a heater power supply 14, and besides these, the arrangement is the same as that shown in FIG. 11.

With this optical device, heater 12, which heats a photonic crystal 2, is disposed on a base 1. Temperature sensor 13, which measures the temperature of photonic crystal 2, is also disposed on base 1. These are positioned close to photonic crystal 2. Heater power supply 14 controls the power supplied to heater 12 in accordance with the temperature measured by temperature sensor 13.

With this embodiment, since photonic crystal 2 is heated while its temperature is measured by means of temperature sensor 13, the temperature of photonic crystal 2 can be set to a desired value, which is preferably a fixed value, to restrain variation of the photonic band gap due to temperature. Heater 12 and temperature sensor 13 may also be formed in a monolithic manner using MEMS techniques.

A Fabry-Perot interferometer and multilayer film mirror (dichroic mirror) are also 0-dimensional or 1-dimensional photonic crystals. Photonic crystal 2 may be applied to such uses. With a soft photonic crystal 2, such as described above, it is anticipated that further research will be carried out on the stability of the sizes and alignment of microspheres 2B or air bubbles 2B', mechanical precision for improving the controllability, long-term stability of the gel, temperature stability, methods of connection with optical fibers and other optical parts, gel-sealing containers, external force application mechanisms that can apply the same external force each time, etc.

INDUSTRIAL APPLICABILITY

This invention can be used in an optical device that uses a photonic crystal.

What is claimed is:

1. An optical device comprising:
   a three-dimensional photonic crystal having plasticity; and external force application means for applying an external force to said three-dimensional photonic crystal to change the photonic band gap of said photonic crystal in any of three dimensions the photonic band gap of said photonic crystal being capable of changing in any of the three dimensions.

2. The optical device as set forth in claim 1, furthermore comprising a feedback means, which measures a physical quantity that varies in accordance with the photonic band gap of the photonic crystal and controls the magnitude of said external force applied by said external force application means in accordance with the measured value.

3. The optical device as set forth in claim 1, furthermore comprising a heater, which heats said photonic crystal, and a temperature sensor, which measures the temperature of said photonic crystal, and wherein the power supplied to said heater is controlled in accordance with the temperature measured by said temperature sensor.

4. The optical device as set forth in claim 1, furthermore comprising a container, which houses said photonic crystal, and wherein said external force application means applies pressure in a fixed direction as said external force to said photonic crystal that is housed inside said container.

5. The optical device as set forth in claim 4, wherein at least a part of the outer walls of said container is transparent or a transparent window is disposed at this part and light is input into said photonic crystal via said part.

6. The optical device as set forth in claim 1, wherein said photonic crystal has a plurality of microspheres of silica or barium titanate contained in a gel substance.

7. The optical device as set forth in claim 1, wherein said photonic crystal has a plurality of microscopic spaces formed and contained inside a gel substance.

8. The optical device as set forth in claim 1, wherein said external force application means is a piezoelectric element that deforms in accordance with an electrical input.

9. The optical device as set forth in claim 1, wherein said external force application means is a pressing mechanism that presses said photonic crystal in accordance with a manual input.

10. The optical device as set forth in claim 1, wherein said external force application means is a hollow member, which can be deformed in a manner such that its inner diameter changes, and said photonic crystal is disposed inside said hollow member.

11. The optical device as set forth in claim 4, wherein said container is formed by processing a semiconductor substrate.

* * * * *